United States Patent Office 2,838,494
Patented June 10, 1958

2,838,494

17β-HYDROXY-17α-METHYL-9(11) ANDROSTENE-3-ONE

Milton E. Herr, Kalamazoo, Mich., assignor to The Upjohn Company, Kalamazoo, Mich., a corporation of Michigan No Drawing. Application September 17, 1956
Serial No. 610,414

3 Claims. (Cl. 260—239.55)

This invention pertains to chemical compounds of the androstane series and is more particularly concerned with 17β-hydroxy-17α-methyl-9(11)-androsten-3-one (I) and its 9(11)-oxide (II) of the formulae

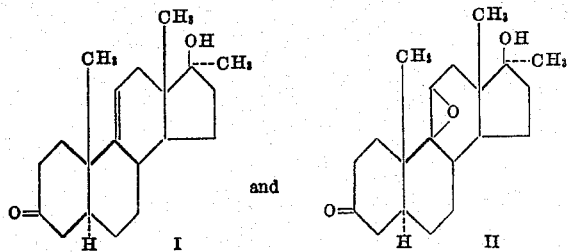

which compounds are chemical intermediates, particularly in the production of the 9α-halo-11β,17β-dihydroxy-17α-methylandrostan-3-one described and claimed in my copending application Serial No. 572,232, filed March 19, 1956, now U. S. Patent No. 2,806,863, of which the present application is a continuation-in-part.

The 17β-hydroxy-17α-methyl-9(11)-androsten-3-one (I) is prepared from the known 9(11)-androstene-3,17-dione by 3-enamine, suitably the pyrrolidyl 3-enamine, formation followed by alkylation of the 17-carbonyl group with methylmagnesium halide (or an alkyl lithium compound) with subsequent hydrolysis to produce the desired 17β-hydroxy-17α-methyl-9(11)-androsten-3-one (I). The 9,11-epoxy-17β-hydroxy-17α-methylandrostan-3-one (II) is prepared from compound I by epoxidation, suitably with perchloric acid and N-bromoacetamide, to produce the corresponding 11-hydroxy-9-bromo compound followed by treatment with base to produce the desired 9,11-epoxy-17β-hydroxy-17α-methylandrostan-3-one (II). Compound II can also be prepared by the method described in application Serial No. 572,232. The 17β-hydroxy-17α-alkyl-9(11)-androsten-3-ones and 9,11-epoxy-17β-hydroxy-17α-alkylandrostan-3-ones wherein the alkyl radical is preferably a lower-alkyl radical containing from two to eight carbon atoms, e. g., ethyl, propyl, isopropyl, butyl, secondary-butyl, amyl, hexyl, heptyl, octyl, etc., are prepared by the same methods. These compounds are also useful as chemical intermediates, particularly in the production of the 9α-halo - 11β,17β - dihydroxy - 17α - alkylandrostan - 3 - ones of copending application Serial No. 572,232.

The following examples are illustrative of certain preferred products and processes and are not to be construed as limiting the invention.

EXAMPLE 1

*3-(N-pyrrolidyl)2,9(11)-androstadien-17-one*

To a solution of 100 milliliters of absolute methanol and eight milliliters of dry pyrrolidine is added ten grams of 9(11)-androstene-3,17-dione. While stirring, the mixture is heated to boiling, then cooled to room temperature, and finally refrigerated at zero degrees centigrade for two hours. The solid enamine is recovered by filtration, washed with cold methanol and dried; yield 10.77 grams; melting point 145 to 150 degrees centigrade with decomposition; $[\alpha]_D^{24}$ is plus 147 degrees in chloroform.

*Analysis.*—Calculated for $C_{23}H_{33}NO$: C, 81.35; H, 9.80; N, 4.13. Found: C, 81.14; H, 9.77; N, 4.07.

EXAMPLE 2

*17β-hydroxy-17-methyl-9(11)-androsten-3-one*

To a stirring mixture of 115 milliliters of 4 molar methyl-magnesium bromide in diethyl ether is added, under nitrogen, a solution of 10.50 grams of 3-(N-pyrrolidyl)-2,9(11)-androstadien-17-one (III) in 200 milliliters of dry tetrahydrofuran during a ten-minute period. The mixture is then warmed and the solvent distilled until the vapor temperature is 62 degrees centigrade. The remaining mixture is heated under reflux for nineteen hours and then cooled in an ice-water bath. While stirring, fifty milliliters of water is added dropwise, followed by fifty milliliters of acetic acid and 200 milliliters of methanol. The solution then is made basic (pH 9) by the addition of ten percent aqueous sodium hydroxide solution and heated under reflux for five minutes. The mixture is made acid (pH 6) by the addition of acetic acid and distilled in vacuo to about 300 milliliters final volume. The solid material which separates is recovered, washed with water, and dried. This material is dissolved in a mixture of 100 milliliters of methylene chloride and 100 milliliters of benzene and passed over a column of 200 grams of activated alumina and eluted with (A) 400 milliliters of hexane (Skellysolve B) plus four percent acetone, (B) 400 milliliters of Skellysolve B plus seven percent acetone, (C) 1000 milliliters of Skellysolve B plus ten percent acetone, (D) 1500 milliliters of Skellysolve B plus 25 percent acetone. Fractions B and first fractions of C give 0.731 gram of crystalline 9(11)-androstene-3,17-dione. Later fractions of C and first fractions of D give 3.86 grams of the desired 17β - hydroxy - 17 - methyl - 9(11) - androsten-3-one which is recrystallized from acetone to yield 2.87 grams of pure product; melting point 196 to 198 degrees centigrade.

*Analysis.*—Calculated for $C_{20}H_{30}O_2$: C, 79.43; H, 10.00, Found: C, 79.53; H, 9.96.

EXAMPLE 3

*9,11β-epoxy-17β-hydroxy-17-methylandrostan-3-one*

17β - hydroxy - 17-methyl - 9(11) - androsten - 3 - one (0.50 gram) suspended in twenty milliliters of acetone is treated with ten milliliters of 0.8 N perchloric acid and, while stirring in a bath at twenty degrees centigrade, a solution of 250 milligrams of N-bromoacetamide in ten milliliters of water is added dropwise over a five-minute period. The bromohydrin separates. After ten minutes, fifty milliliters of water is added and the product is recovered by filtration, washed with water and dried; yield 0.333 gram of bromohydrin; melting point 118 to 120 degrees centigrade with decomposition.

This material is dissolved in ten milliliters of ninety percent methanol and titrated with N/10 aqueous sodium hydroxide solution until the mixture is pink to phenolphthalein. The mixture is diluted with twenty milliliters of water and the separated 9,11β-epoxy-17β-hydroxy-17-methylandrostan-3-one recovered by filtration, dried, and recrystallized from acetone; melting point 205 to 207 degrees centigrade.

EXAMPLE 4

*9,11β-epoxy-17β-hydroxy-17-methylandrostan-3-one*

One gram of 9,11β-epoxy-17β-hydroxy-17α-methyl-4-androsten-3-one suspended in twenty milliliters of 95 percent ethanol is treated with 100 milligrams of five percent palladium on charcoal and shaken with hydrogen for 7½ minutes, the hydrogen pressure being about thirty pounds per square inch. The catalyst is removed by filtration and the filtrate concentrated to dryness in vacuo on a hot water bath. The residue is dissolved in benzene and heptane (Skellysolve C) added. There is obtained 0.215 gram of 9,11β-epoxy-17β-hydroxy-17α-methyl androstan-3-one; melting point 195 to 202 degrees centigrade. Recrystallized from acetone it melted at 206 to 210 degrees centigrade; $[\alpha]_D^{24}$ plus eight degrees in ethanol.

*Analysis.*—Calculated for $C_{20}H_{30}O_3$: C, 75.44; H, 9.50. Found: C, 75.76; H, 9.90.

I claim:

1. A compound selected from the group consisting of 17β-hydroxy-17α-methyl-9(11)-androsten-3-one and 9,11-epoxy-17β-hydroxy-17α-methylandrostan-3-one.

2. 17β-hydroxy-17α-methyl-9(11)-androsten-3-one.

3. 9,11-epoxy-17β-hydroxy-17α-methylandrostan-3-one.

References Cited in the file of this patent

UNITED STATES PATENTS

| | | |
|---|---|---|
| 2,503,842 | Reichstein | Apr. 11, 1950 |
| 2,730,525 | Hogg | Jan. 10, 1956 |
| 2,752,365 | Marlatt | June 26, 1956 |
| 2,769,019 | Herr | Oct. 30, 1956 |
| 2,781,369 | Oliveto | Feb. 12, 1957 |

OTHER REFERENCES

Klein et al., Chem. Abst., vol. 49, page 2596 (1955), citing Casopis Lekaru Ceskych 93, pages 377–383 (1954).

Lubschez, Chem. Abst., vol. 49, page 13457 (1955), citing Pediatrics 15, pp. 537–42 (1955).